April 21, 1953 H. J. MURPHY 2,635,666
NUT RETAINER DEVICE
Filed March 3, 1950

INVENTOR:
HOWARD J. MURPHY,
BY Philip E. Parker
ATTORNEY.

Patented Apr. 21, 1953

2,635,666

UNITED STATES PATENT OFFICE 2,635,666

NUT RETAINER DEVICE

Howard J. Murphy, Lynnfield, Mass., assignor to United-Carr Fastener Corporation, Cambridge, Mass., a corporation of Massachusetts Application March 3, 1950, Serial No. 147,468

12 Claims. (Cl. 151—41.75)

This invention relates generally to caged nut fastening devices, and has particular reference to a caged nut which is adapted for assembly in an opening in a supporting panel from the front thereof so that the nut is disposed behind the panel in position to receive a bolt inserted from the front of the panel.

Fasteners of this general type are used where it is desirable to secure articles to a supporting panel from one side thereof, where access to the other side is difficult or impossible, as in certain assembly operations in the manufacture of automobiles. Although many types of sheet metal fasteners are known which are capable of being attached to a panel through an opening, such fasteners do not have the strength required for many installations, and for this reason in many cases it is desirable to use a nut and bolt assembly. However, this has required that access be available to both sides of the supporting panel.

The object of the invention is to provide a caged nut fastening device which is adapted to be assembled in an opening in a supporting panel from one side thereof so that the nut is disposed on the opposite side of the panel.

A further object of the invention is to provide a caged nut fastening device in which a nut-enclosing portion which is adapted to be passed edgeways through a supporting panel opening having one dimension less than the width of the nut is provided with means for bearing against the outer surface of the panel which is attached to the nut-enclosing portion off center in relation thereto.

A still further object of the invention is to provide a caged nut fastening device having means on the cage spaced below the nut-enclosing portion for bearing against the outer face of the panel and aligning the nut with the opening, in which said means is attached to the nut-enclosing portion off center in relation thereto to form an overhanging portion to enable the nut-enclosing portion to pass edgeways through an opening in a supporting panel.

A further object of the invention is to provide a caged nut of the type described in which the cage has deformable means for retaining the nut in the nut-enclosing portion, whereby the nut may be pulled out of the nut-enclosing portion by the assembly of a bolt into the nut.

Other objects of the invention will, in part, be obvious, and will, in part, appear hereinafter. For a fuller understanding of the nature and objects of the invention, reference should be had to the following detailed description, taken in conjunction with the accompanying drawing, in which.

Figure 1:
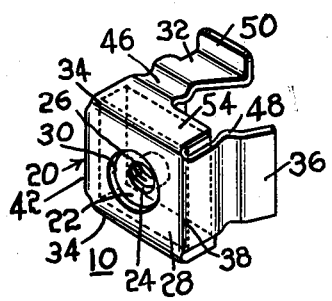
Fig. 1 is a perspective view of a caged nut fastening device embodying the features of the invention.
Figure 2:
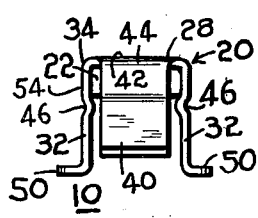
Fig. 2 is a view in elevation of the caged nut of Fig. 1.
Figure 3:
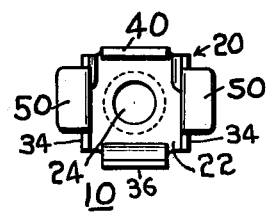
Fig. 3 is a bottom plan view of the nut of Fig. 1.

Referring to the drawing, there is illustrated a caged nut fastening device 10, which is adapted for assembly into an opening 12 in a supporting panel 14 to enable an article 16 to be secured thereto by means of a bolt 18.

The caged nut 10 comprises a sheet metal cage 20 and a nut 22 retained in the cage which is preferably, but not necessarily, square, and comprises a bolt-receiving opening 24 having internal threads 26. The cage 20 comprises a base 28 disposed across the top end face of the nut having an opening 30 disposed therein in alignment with the opening 24 in the nut, a pair of legs 32 extending downwardly from opposite sides 34 of the base, a cage support leg 36 extending downwardly from a side 38 of the base connecting the said opposite sides 34, and a spring arm 40 extending downwardly from the side 42 opposite the side 38. The legs 32, the cage support leg 36, and the spring arm 40 form a nut-enclosing portion 44, and to retain the nut therein, inwardly extending shoulders 46 and 48 are provided below the nut on the legs 32 and cage support leg 36 respectively, and said shoulders are sufficiently deformable or flexible to allow the nut to pass out of the nut-retaining portion for a purpose to be hereinafter described.

The legs 32 are each provided with outwardly extending feet 50 for bearing against the outer face 52 of the supporting panel 14, and the feet 50 are disposed beneath the central portion of opposite sides 34 of the base so that the nut 22 will be substantially aligned with the opening 12 in the panel after the fastener 10 is assembled therein. To enable the fastener to be assembled through the opening in the supporting panel, the legs 32 are inclined relative to the base so as to join the base at corresponding ends of opposite sides 34 so that one end of the nut-enclosing portion forms an overhanging portion 54. In some cases the legs 32 need not be joined at the extreme ends of opposite sides, but must merely be sufficiently off center in relation to the nut-enclosing portion 44, depending on the relative dimensions of the fastener and the opening, to allow assembly of the fastener in the manner to be described hereinafter. The cage support leg 36 is shorter than the legs 32, for bearing against the rear face 56 of the panel 14 during assembly of the fastener, and the spring arm 40 is also shorter than the legs 32 to enable it to snap behind an edge of the panel during assembly.

Figure 7:
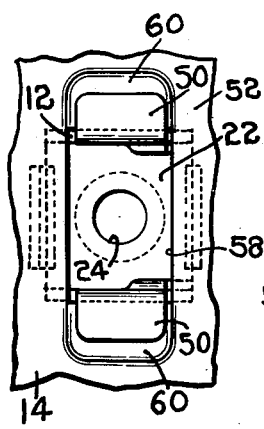
Fig. 7 is a bottom plan view of the caged nut and panel assembly of Fig. 6.
Figure 4:
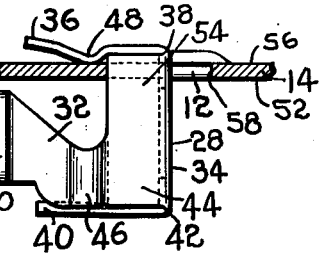
Fig. 4 is a view in elevation, partly in section, of the caged nut of the invention and a supporting panel, illustrating the first step in the assembly of the caged nut into the opening in the panel.
Figure 5:
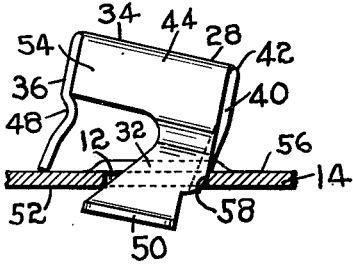
Fig. 5 is a view of the caged nut and panel of Fig. 4, illustrating a further step in the assembly of the caged nut into the opening in the supporting panel.
Figure 6:
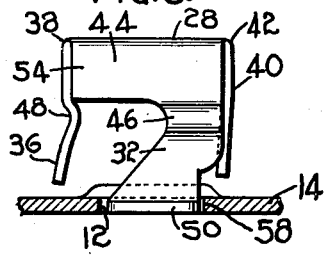
Fig. 6 is a view of the caged nut and panel in which the caged nut is completely assembled in the opening in the panel.

The method of assembly of the fastener in the opening in the panel is best illustrated by reference to Figs. 4–7. The opening 12 is preferably rectangular, with the lesser dimension of the rectangle being less than the width of the nut, to provide an adequate bearing surface for the nut, as is illustrated in Fig. 7. The first step in the assembly operation is illustrated in Fig. 4, where the cage support leg 36 is hooked into the opening 12 so that the overhanging portion 54 of the nut-enclosing portion 44 protrudes into the opening. The nut-enclosing portion 44 is then pushed through the opening 12 edgeways, and the plane of the base 28 is rotated relative to the plane of the supporting panel 14 so that the end of the cage support leg 36 bears against the rear face 56 of the panel, and the spring arm 40 rides on the adjacent edge 58 of the panel, in the position shown in Fig. 5. The fastener may then be forced completely into the opening so that the end of the spring arm 40 snaps behind the adjacent edge 58, and the feet 50 bear against the outer face 52 of the panel. It is not essential that the cage support leg and the spring arm bear directly against the rear surface of the panel after the above assembly operation, and hence they may be made shorter than is necessary, to enable the fastener to be assembled in panels of different thicknesses. If desired, suitable indentations or depressions 60 may be provided in the panel adjacent the opening 12 to receive the feet 50, to prevent the feet from protruding beyond the surface of the panel, and to assist in aligning the fastener in relation to the opening.

Figure 8:
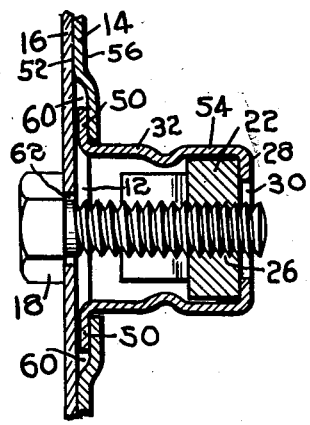
Fig. 8 is a view in elevation, partly in section, of the caged nut and supporting panel assembly of Fig. 6, illustrating the first step in securing an article to the supporting panel.
Figure 9:
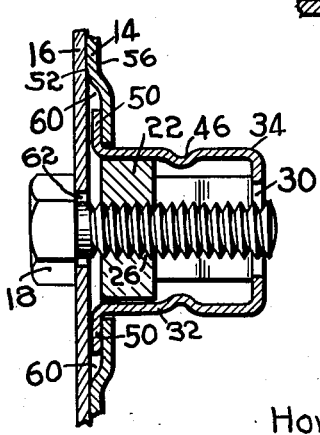
Fig. 9 is a view in elevation, partly in section, similar to Fig. 8 illustrating the final step in securing an article to the supporting panel.
Figure 10:
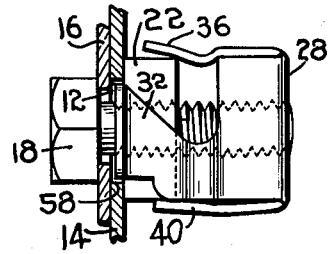
Fig. 10 is a view in elevation, partly in section, of the assembly of Fig. 9 as seen from the bottom.

The method of assembly of an article 16, which in some cases may be another panel to be superimposed on the supporting panel, is illustrated in Figs. 8–10. The bolt 18, which extends through an opening 62 in the article 16, is inserted into the opening 12 for engagement with the nut 22, as illustrated in Fig. 8. As the bolt is tightened in the nut, the nut is drawn out of the nut-enclosing portion 44 by slightly deforming or springing apart the shoulders 46 and 48, and is drawn against the rear surface 56 of the panel, thereby securely holding the article 16 in assembly with the supporting panel 14 (see Fig. 9). During the tightening of the bolt, the nut is prevented from rotating by the legs 32, the cage support leg 36, and the spring arm 40, and the cage 20 is prevented from rotating in the opening by the legs 32 extending through the rectangular opening at opposite ends thereof.

If it is desired to disassemble the article 16 from the panel, this may be accomplished by removing the bolt, and the cage will retain the nut in position to prevent it from falling into an inaccessible position behind the panel. Although in the illustrated embodiment the nut is square, a suitable cage embodying the features of the invention may be constructed to accommodate nuts of any desired shape. The cage may be cheaply and rapidly formed from a single piece of sheet metal on automatic machines, and the nut may be assembled during the cage forming operation, or may be assembled later.

Since certain obvious modifications may be made in the device without departing from the scope of the invention, it is intended that all matter contained herein be interpreted in an illustrative and not in a limiting sense.

I claim:

1. A caged nut fastening device for assembly through an opening in a supporting panel from the outer face thereof so that the nut is disposed behind the panel for bearing against the inner face, said fastener comprising a cage member and a nut assembled therein, said cage comprising a base disposed across an end face of the nut and a pair of spaced legs extending angularly from a portion of the base near one side of the nut, said legs having outwardly extending feet on the ends thereof for bearing against the outer face of the panel on opposite sides of the opening when the fastener is assembled therein, said legs having their edges opposite said one side of said nut inclined relative to the base so that said feet are disposed on said outer face opposite the central portion of opposite edges of the nut and spaced from the ends of said edges of the nut, and so that said base and said nut have overhanging portions opposite said edges of said legs for facilitating the insertion of said fastening device into said opening, said overhanging portions being disposed to be hooked into the opening so that said base and nut may be passed edgeways therethrough and then rotated relative to the plane of the panel until said base and said nut are parallel thereto.

2. A caged nut fastening device as set forth in claim 1 in which the cage has means thereon extending from said one side of the nut for snapping engagement behind the supporting panel when the fastener is assembled therein to retain said device behind said panel.

3. A caged nut fastening device as set forth in claim 1 in which the cage has means thereon extending from said one side of the nut for snapping engagement in the opening behind an edge of the supporting panel, and a cage support leg extending in the same general direction as said means from the cage on the side of the nut opposite said one side for bearing against the inner face of the panel during assembly of the fastener.

4. A caged nut fastening device for assembly in an opening in a supporting panel from the outer face thereof so that the nut is disposed behind the panel, said fastener comprising a cage member and a nut assembled therein, said cage member comprising a nut-enclosing portion, panel-engaging means spaced below the nut-enclosing portion for bearing against the outer face of the panel on opposite sides of the opening, said panel-engaging means being disposed centrally in relation to the nut so that the nut will be aligned with the opening when the fastener is assembled therein, and being attached to the nut-enclosing portion off-center in relation thereto to provide an overhanging edge thereon, a first support arm extending downwardly from said overhanging edge, said first support arm being disposed to be hooked into the opening so that the nut-enclosing portion and the nut may be passed edgeways therethrough and then rotated relative to the plane of the panel with said first support arm bearing against the inner face of the panel so that the plane of the nut is parallel thereto, and thereby pulling the panel-engaging means toward the panel to bear against the outer face thereof, and a second support arm extending downwardly from the edge of the nut-enclosing portion opposite the overhanging edge, said second support arm having a portion disposed to snap into engagement in the opening behind an edge of the panel when the panel-engaging means is pulled toward the panel.

5. A caged nut fastening device as set forth in claim 4 in which the cage member has means thereon for retaining the nut in the nut-enclosing portion so that the nut is disposed in spaced relation to the panel when first assembled, said means being deformable to allow the nut to be pulled out of the nut-enclosing portion to bear against the inner face of the panel by assembly of a bolt in the nut from the front of the panel.

6. A caged nut fastening device for assembly through an opening in a supporting panel from the outer face thereof so that the nut is disposed behind the panel for bearing against the inner face, said fastener comprising a cage member and a nut assembled therein, said cage comprising a base disposed across an end face of the nut and a pair of spaced legs extending angularly from a portion of the base near one side of the nut, said legs having laterally outwardly extending feet on the ends thereof for bearing against the outer face of the panel on opposite sides of the opening when the fastener is assembled therein, said legs being inclined relative to the base so that said feet may be disposed on said outer face opposite the central portion of opposite sides of the nut and said cage having means retaining the nut against the base, whereby after assembly of the fastener in the opening in the supporting panel the nut is disposed in spaced relation to the panel, said means being deformable to allow the nut to be pulled away from the base to bear against the inner face of the panel by assembly of a bolt into the nut from the outer side of the panel.

7. A cage nut fastener in accordance with claim 6 in which the nut retaining means comprise portions of the legs of the cage having inwardly extending opposed convex surfaces.

8. A caged nut fastening device for assembly through an opening in a supporting panel from the outer face thereof so that the nut is disposed behind the panel for bearing against the inner face, said fastener comprising a cage member and a square nut assembled therein, said cage comprising a square base disposed across an end face of the nut, a pair of legs extending substantially normally from corresponding ends of two opposite sides of the base, said legs having outwardly extending feet on the ends thereof for bearing against the outer face of the panel on opposite sides of the opening when the fastener is assembled therein, said legs being inclined relative to the base so that said feet may be disposed on said outer face opposite the central portion of said two opposite sides of the nut, and said cage having means retaining the nut against the base, whereby after assembly of the fastener in the opening in the supporting panel the nut is disposed in spaced relation to the panel, said means being deformable to allow the nut to be pulled away from the base to bear against the inner face of the panel by assembly of a bolt into the nut from the outer side of the panel.

9. A nut fastening device for assembly into an opening in a supporting panel from the outer face thereof so as to dispose a major portion behind the panel, said fastener comprising a cage element and a nut element, said cage element comprising a nut element enclosing portion, panel-engaging means spaced below the nut element enclosing portion for bearing against the outer face of the panel on opposite sides of the opening, said panel-engaging means being disposed centrally in relation to the nut element so that the nut element will be aligned with the opening when the fastener is assembled therein, and being attached to the nut element enclosing portion off-center in relation thereto to provide an overhanging edge thereon, a first support arm extending downwardly from said overhanging edge, said first support arm being disposed to be hooked into the opening so that the nut element enclosing portion and the nut element may be passed therethrough and then rotated relative to the plane of the panel with said first support arm bearing against the inner face of the panel so that the plane of the nut element is parallel thereto, and thereby pulling the panel-engaging means toward the panel to bear against the outer face thereof, and a second support arm extending downwardly from the edge of the nut element enclosing portion opposite the overhanging edge, said second support arm having a portion disposed to snap into engagement in the opening behind an edge of the panel when the panel-engaging means is pulled toward the panel.

10. A cage member for assembly into an opening in a supporting panel for securing a fastener element behind the panel, said cage member being formed from a single piece of sheet material and comprising a fastener element enclosing portion, panel-engaging means spaced below the fastener element enclosing portion for bearing against the outer face of a supporting panel on opposite sides of an opening therein, said panel-engaging means being disposed centrally in relation to the fastener element engaging portion so that a fastener element in said fastener element enclosing portion will be aligned with the opening when the cage member is assembled in the opening, said panel-engaging means attached to the fastener element enclosing portion off-center in relation thereto to provide an overhanging edge thereon, a first support arm extending downwardly from said overhanging edge, said first support arm being disposed to be hooked into the opening so that the fastener element enclosing portion and any fastener element therein may be passed edgeways therethrough and then rotated relative to the plane of the panel with said first support arm bearing against the inner face of the panel so that the plane of the base of the fastener enclosing element is parallel thereto, and thereby pulling the panel-engaging means toward the panel to bear against the outer face thereof, and a second support arm extending downwardly from the edge of the fastener element enclosing portion opposite the oppositely overhanging edge, said second support arm having a portion disposed to snap into engagement in the opening behind an edge of the panel when the panel-engaging means is pulled toward the panel.

11. A cage member in accordance with claim 10 in which the cage member has means thereon for retaining the fastener element in the fastener element enclosing portion so that the fastener element may be disposed in spaced relation to the panel when first assembled therein, said means being deformable to allow the fastener element to be pulled out of the fastener element enclosing portion to bear against the inner face of the panel by the application of a pulling force to the fastener element from the front of the panel.

12. A fastener for use with a panel accessible from one side only and provided with an opening; said fastener comprising a nut of a length to extend across the opening and overlap opposite edges thereof and of a width less than the width of the opening so as to pass through it, said nut being provided with a threaded opening to receive a bolt, a retaining member comprising laterally spaced substantially flat side arms, an end wall connecting the arms at one end and laterally and outwardly extended flanges at their other ends, cooperating means on the arms and nut mounting the nut between said arms for longitudinal sliding movement on the arms toward and from the end wall, lugs on the side arms to engage the nut to yieldingly retain it in a position adjacent the rear end wall and a position spaced forwardly from this wall, and said side arms being provided with transverse recesses extending inwardly from one edge thereof to the rear of the flanges to receive one edge of the panel opening and permit the nut to pass through this opening while being held in the position adjacent the end wall.

HOWARD J. MURPHY.

References Cited in the file of this patent

UNITED STATES PATENTS

| Number | Name | Date |
|---|---|---|
| 2,218,823 | Kengel | Oct. 22, 1940 |
| 2,495,037 | Tinnerman | Jan. 17, 1950 |